A. P. PHILLIPS.
PRESSURE RECORDING GAGE.
APPLICATION FILED APR. 17, 1909.

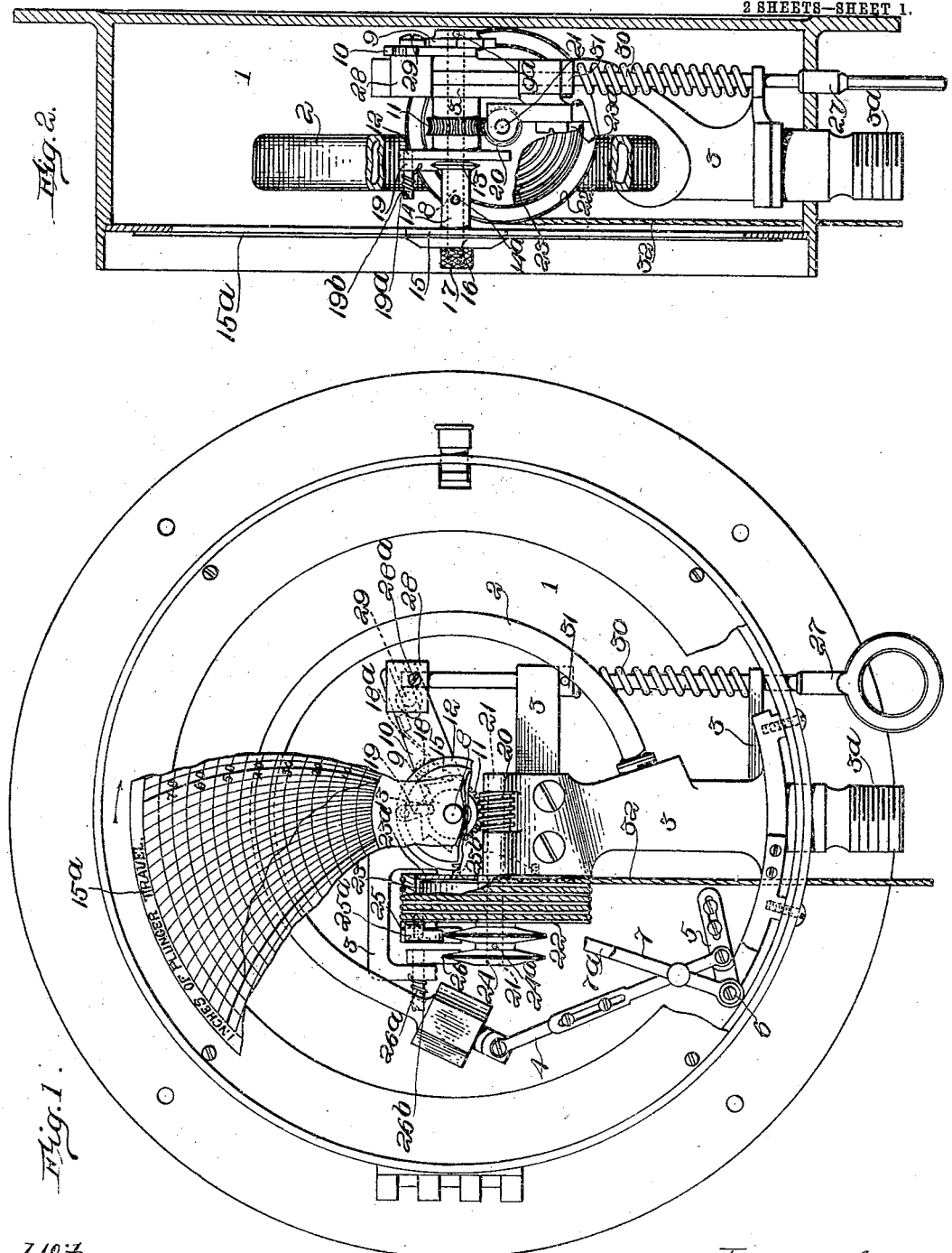

951,658.

Patented Mar. 8, 1910.
2 SHEETS—SHEET 2.

UNITED STATES PATENT OFFICE.

ARTHUR PAGE PHILLIPS, OF HAVERHILL, MASSACHUSETTS, ASSIGNOR TO CROSBY STEAM GAGE AND VALVE COMPANY, OF BOSTON, MASSACHUSETTS, A CORPORATION OF MASSACHUSETTS.

PRESSURE-RECORDING GAGE.

951,658.     Specification of Letters Patent.     Patented Mar. 8, 1910.

Application filed April 17, 1909. Serial No. 490,537.

*To all whom it may concern:*

Be it known that I, ARTHUR PAGE PHILLIPS, a citizen of the United States, and resident of Haverhill, in the county of Essex and State of Massachusetts, have invented certain new and useful Improvements in Pressure-Recording Gages, of which the following is a specification.

My invention relates to that class of pressure recording gages in which a record is made by moving a pen over a moving chart. Its object is to provide for automatically rotating the chart synchronously with the pen, in order to secure a diagram indicating the amount of pressure at each step or instant of an operation, for example the operation of pressing a car wheel upon its axis.

In recording gages heretofore employed provision has been made for moving the pen and chart simultaneously by means of mechanism actuated by steam or other pressure, but in these cases the mechanism is such that, when in operation, the pen and chart must move simultaneously during a portion at least of the operation.

My improvement consists in providing for moving the pen and chart simultaneously but independently for the purpose hereinafter stated.

The invention is illustrated by the accompanying drawings in which—

Figure 4:
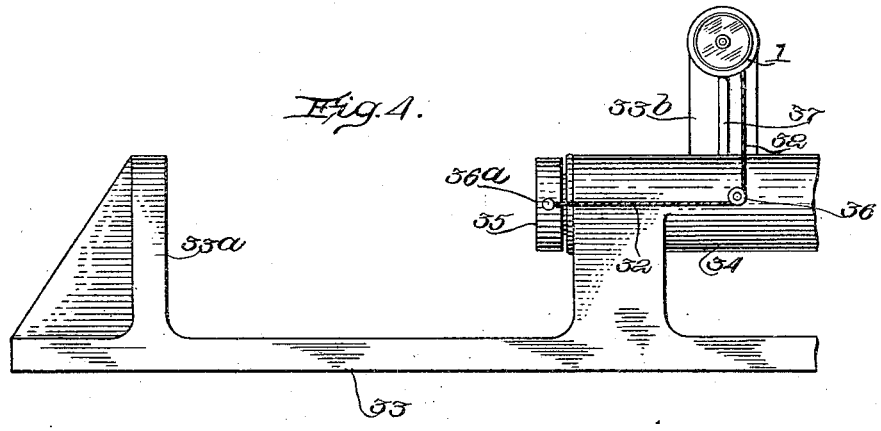
Figure 5:
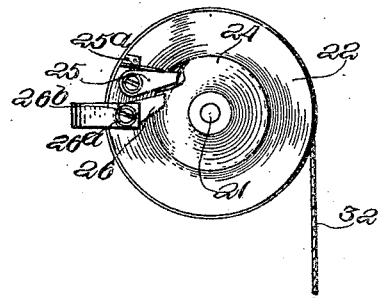

Figure 1 is a front elevation of the gage with the cover and part of the chart removed. Fig. 2 is a side elevation with the case in section looking from the right of Fig. 1. Fig. 3 is a detailed view of the spring controlled cord drum. Fig. 4 is an elevation of the wheel press with the gage mounted thereon.

Similar characters refer to similar parts throughout the several drawings.

1 is the gage case. The tube spring 2 is fixed at its inner end to the gage socket 3 which extends through the case and has its outer end 3ª threaded to engage the pressure supply pipe 37 (Fig. 4). To the outer end of the tube spring 2 is pivoted the longitudinally adjustable link 4 which is pivoted at its other end to the longitudinally adjustable arm 5 fixed to the shaft 6 journaled in the socket 3. On this shaft are fixed the pen 7 and the pen table 7ª (each partly broken away), the former being disposed over the chart and the latter under the chart in a well known manner. Centrally disposed is the rotatable stud 8 journaled in a long bearing in the socket 3. The ratchet wheel 9 is fixed to the lower end of the stud 8 by the pin 9ª; the slotted arm 10 is fulcrumed on the stud 8; the worm gear 11 is rotatably mounted on the stud 8 and carries on its upper end the disk 12 preferably forming one piece therewith. The clutch wheel 13 forms the lower end of the sleeve 14, which is fixed to said stud 8 by the pin 14ª and whose upper end forms the chart support 15. The chart 15ª is held on its support 15 by the collar 16 and thumb nut 17. The slotted arm 10 carries the pawl 18 adapted to drive the ratchet wheel 9 and controlled by the spring 18ª mounted on said slotted arm 10. The clutch driving pawl 19, controlled by the spring 19ª, is mounted on the stud 19ᵇ fixed to the disk 12, and is adapted to drive the clutch wheel 13. The worm 20 has its shaft 21 journaled in the gage socket.

The cord drum 22 is rotatably mounted on the shaft 21 and furnished with the controlling spring 23, one end of which is fastened to the gage socket and the other to said drum; a shield 23ª for said spring is fixed to the gage socket by screws 23ᵇ. The double clutch wheel 24 is fastened to the worm shaft 21 by the pin 24ª; the clutch driving pawl 25, controlled by the spring 25ª, is mounted on the cord drum 22; and the clutch retaining pawl 26, controlled by the spring 26ª, is mounted on the stud 26ᵇ fixed to the gage socket.

The resetting rod 27 is slidingly mounted in the gage socket 3 and screwed into the block 28, being locked therein by the set screw 28ª. The shoulder screw 29 is screwed into the block 28 and adapted to travel in the slotted portion of the arm 10 thereby actuating said arm. The controlling spring 30 is mounted on the sliding rod 27 and is confined between the gage socket 3 and the collar 31 which is longitudinally adjustably mounted on said rod and limits the inward travel thereof by engaging the socket 3. The cord 32, fixed to the drum 22, connects the gage mechanism with the plunger head 35 (Fig. 4) of the hydraulic press 34 mounted on the frame 33, which is furnished with the wheel support 33ª and gage support 33ᵇ; said cord passes over the pulley 36 mounted on the frame and is fixed to the stud 36ª on the plunger head.

The chart, as indicated in Fig. 1, is divided into eight equal radial sections each of which is subdivided into eighteen equal sections and the ratchet wheel has eight teeth, while the travel of the resetting rod 27 is so determined by the collar 31 that, when the parts are in the position shown in Fig. 1, such resetting rod is adapted to rotate said ratchet wheel and with it said chart one eighth of a complete rotation. If the pen 7 has traveled but partially across a section of the chart and the pawl 18 has consequently traveled partially along a section of the ratchet wheel, then the resetting arm, if pulled to a stop, will carry the chart around to the beginning of the next section leaving the pen at zero; and the resetting arm being released the controlling spring 30 will return the slotted arm 10 to its normal position, carrying the driving pawl into engagement with the next tooth of the ratchet wheel leaving the mechanism in its normal position as shown in Fig. 1.

The operation is as follows: Normally, that is before the beginning of an operation, for instance forcing a wheel upon its axle, the wheel (not shown) rests upon the base 33 (Fig. 4) and against the support 33ª, and the axle (not shown) is suspended between the hub of the wheel and plunger head 35 ready to be driven into said hub by said plunger head. When pressure is introduced, the hydraulic press drives the plunger head 35 outwardly, forcing the wheel upon its axle, said plunger head pulling the cord 32 and thereby rotating the drum 22, the worm 20, worm gear 11, disk 12 carrying the driving clutch pawl 19, which clutches the wheel 13 rotating it with the chart support 15 and the chart held thereon. By this means the chart is rotated either slowly, or swiftly, or spasmodically, as the plunger head 35 pursues its course, exerting upon the axle a degree of pressure depending at each instant upon the resistance. While the chart is being rotated, as described, the pressure from the hydraulic press having entered spring tube 2 through the pipe 37, expands said tube and moves the pen 7 over the moving chart in a well known manner. At each operation a diagram similar to that shown on the chart is made by the pen and indicates radially the degree of pressure at each successive instant of the operation and circumferentially the exact position of the wheel upon its axle at each successive instant, thus showing the distance measured in inches traveled by the axle and recording the exact pressure upon the axle at each position it assumes on entering the hub. For instance, assuming the length of the axle to be eighteen inches, the diagram indicates that when the wheel had advanced six inches upon the axle the pressure was 15 tons, and that when it had advanced nine inches the pressure was 25 tons, etc. The pressure normally increases as the axle advances but sometimes, owing to imperfections of the parts, the axle suddenly advances quickly, or does not require the anticipated pressure, and the diagram indicates exactly at what point this happens. This is one purpose of the invention. When the operation is completed, the pressure being shut off, the drum is returned to its normal position by the spring 23, the driving clutch pawl 25 sliding over the clutch wheel 24 which is held in *statu quo* by the retaining clutch pawl 26.

At the beginning of an operation the pen is at zero, or starting point, on the chart and at the end of an operation the chart should have traveled one eighth of a rotation leaving the pen on the first or zero radial of the next section. Sometimes, however, the operation is interrupted before the chart has traveled this prescribed distance or the chart may have to travel a shorter distance in any case and the resetting means above described are provided to meet this contingency. To reset the machine, the operator pulls the rod 27 downward thereby rotating the arm 10 and driving the ratchet wheel 9 and the stud 8, to which said ratchet wheel is attached, and with it the chart support 15 fixed to said stud 8, the clutch wheel 13 sliding past the clutch driving pawl 19 which during this operation remains stationary. The travel of the resetting arm 27 is limited to the distance between the lower edge of the block 28 and the gage socket 3, with which said block comes into contact in its downward movement, and the parts are all so adjusted by the adjustable collar 31 that, when the said block 28 is in contact with said socket 3, the pen is over the zero on the chart. When the chart is thus properly reset and the operator releases the rod 27, it is carried into its normal position shown in Fig. 1 by the controlling spring 30. The machine is then ready for a new operation.

Having described my invention what I claim and desire to secure by Letters Patent is:—

1. In a pressure recording gage, a Bourdon tube spring, pen and chart support, with means actuated by said Bourdon tube spring for moving said pen and independent means including a rotary drum for simultaneously rotating said chart support in one direction and means for preventing the rotation of said chart support in the opposite direction, said Bourdon tube spring and said independent means being operated by the fluid under pressure; substantially as described.

2. In a pressure recording gage, a Bourdon tube spring, pen and chart support, with means actuated by said Bourdon tube spring for moving said pen and independent means for simultaneously rotating said chart support in one direction and means for preventing the rotation of said chart support in the opposite direction, said Bourdon tube spring and said independent means being operated by the fluid under pressure; substantially as described.

3. In a pressure recording gage, a pen and chart support, with means for moving said pen and independent means including a rotary drum for simultaneously rotating said chart support in one direction and means for preventing the rotation of said chart support in the opposite direction, said means and said independent means being operated by the fluid under pressure; substantially as described.

4. In a pressure recording gage, a pen and chart support, with means for moving said pen and independent means for simultaneously rotating said chart support in one direction and means for preventing the rotation of said chart support in the opposite direction, said means and said independent means being operated by the fluid under pressure; substantially as described.

5. In a pressure recording gage, a pen and a chart support, with mechanism adapted to be connected with and actuated by the fluid under pressure and to move said pen and rotate said chart support simultaneously but independently in one direction for preventing the rotation of said chart support in the opposite direction; substantially as described.

6. In a pressure recording gage, a Bourdon tube spring, pen and chart support, with means actuated by said Bourdon tube spring for moving said pen and independent means including a rotary drum for simultaneously rotating said chart support in one direction and means for preventing the rotation of said chart support in the opposite direction, said Bourdon tube spring and said independent means being operated by the fluid under pressure, together with manually operative means for resetting said chart support; substantially as described.

7. In a pressure recording gage, a Bourdon tube spring, pen and chart support, with means actuated by said Bourdon tube spring for moving said pen and independent means for simultaneously rotating said chart support in one direction and means for preventing the rotation of said chart support in the opposite direction, said Bourdon tube spring and said independent means being operated by the fluid under pressure, together with manually operative means for resetting said chart support; substantially as described.

8. In a pressure recording gage, a pen and chart support, with means for moving said pen and independent means including a rotary drum for simultaneously rotating said chart support in one direction and means for preventing the rotation of said chart support in the opposite direction, said means and said independent means being operated by the fluid under pressure, together with manually operative means for resetting said chart support; substantially as described.

9. In a pressure recording gage, a pen and chart support, with means for moving said pen and independent means for simultaneously rotating said chart support in one direction and means for preventing the rotation of said chart support in the opposite direction, said means and said independent means being operated by the fluid under pressure, together with manually operative means for resetting said chart support; substantially as described.

10. In a pressure recording gage, a pen and a chart support, with mechanism adapted to be connected with and actuated by the fluid under pressure and to move said pen and rotate said chart support simultaneously but independently in one direction and means for preventing the rotation of said chart support in the opposite direction; together with manually operative means for resetting said chart support; substantially as described.

In testimony whereof I have affixed my signature, in presence of two witnesses.

ARTHUR PAGE PHILLIPS.

Witnesses:
RALPH W. FOSTER,
GEO. G. CLARK.

Correction in Letters Patent No. 951,658.

It is hereby certified that in Letters Patent No. 951,658, granted March 8, 1910, upon the application of Arthur Page Phillips, of Haverhill, Massachusetts, for an improvement in "Pressure-Recording Gages," an error appears in the printed specification requiring correction as follows: Page 3, line 34, after the word "direction" the words *and means* should be inserted; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*